(No Model.)
E. TURCK.
HEAT PRODUCING COMPOSITION AND METHOD OF PRODUCING HEAT FOR INCUBATORS, &c.
No. 579,727. Patented Mar. 30, 1897.
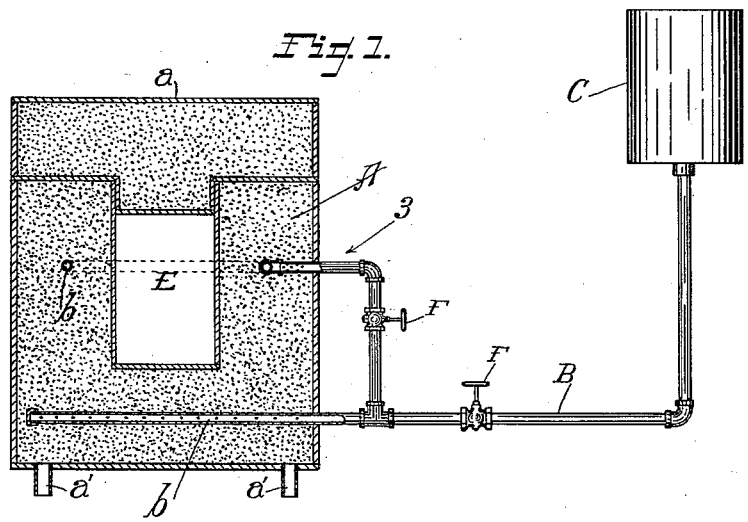
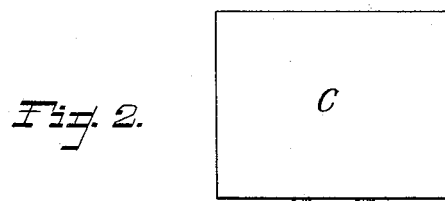
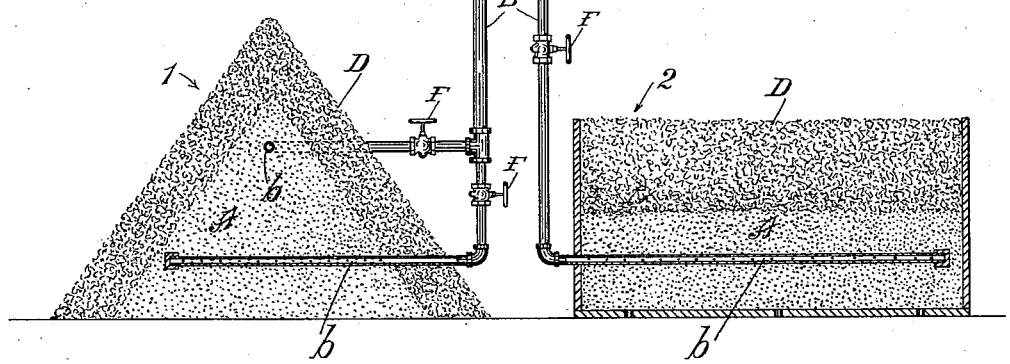
Witnesses
Perry Kingman.
Alfred I. Townsend.
Inventor
Emil Turck
by Hazard Townsend
his atty.

UNITED STATES PATENT OFFICE.

EMIL TURCK, OF ANAHEIM, CALIFORNIA.

HEAT-PRODUCING COMPOSITION AND METHOD OF PRODUCING HEAT FOR INCUBATORS, &c.

SPECIFICATION forming part of Letters Patent No. 579,727, dated March 30, 1897.

Application filed July 27, 1896. Serial No. 600,583. (No specimens.)

*To all whom it may concern:*

Be it known that I, EMIL TURCK, a subject of the Emperor of Germany, and having declared my intention of becoming a citizen of the United States, residing at Anaheim, in the county of Orange and State of California, have invented a new and useful Heat-Producing Composition and Method of Producing Heat for Incubators and for Horticultural and other Purposes, of which the following is a specification.

One object of my invention is to produce a uniform moderate heat suitable for incubators for incubating eggs, and also for hotbeds, hothouses, and for various purposes in which a constant uniform moderate heat is required.

Another object of my invention is to provide for regulating the heat, increasing and diminishing it as required.

My newly-invented composition is composed of a mixture of a solution of sugar or molasses and sawdust, straw, manure, leaves, or other organic absorbent material which will give the air free access to the solution throughout the mass, and thus carry on a constant process of slow combustion and fermentation of carbohydrates and other heat-producing substances. The solution may be introduced to the mass at one time or periodically, or it may be constantly fed to the mass through perforated pipes or by any other suitable means.

The accompanying drawings illustrate the application of my invention with perforated pipes.

Figure 1 is a view of an incubator embodying the principles of my invention with means for regulating the heat. Fig. 2 shows two forms of hotbeds embodying my invention.

A indicates the composition.

B indicates a pipe leading from a tank C of the solution. The pipe B is perforated to allow the liquid to ooze out into the composition. I contemplate using porous tiles instead of the perforated pipe. The solution which I use consists principally of water and about fifteen per cent. to twenty-five per cent. of sugar; but the percentage of sugar may be increased or diminished.

To decrease the heat, the strength of the solution may be decreased, and to increase the heat the solution may be made stronger; but an increase or diminution of the heat can be produced with the same strength of solution by increasing or diminishing the quantity supplied in a given time.

In the drawings, b indicates the perforated pipe.

D indicates soil which covers composition A.

1 indicates a pyramid hotbed.

2 indicates a flat hotbed, and 3 indicates an incubator.

E indicates the chamber within the incubator, in which the eggs or chickens will be kept warm.

The solution can be applied to one or more layers of absorbent material. In the pyramid hotbed shown two pipes for introducing the solution are shown, so as to introduce the solution to two separate layers of absorbent material.

In the place of the sugar or molasses raw sugar-beet in a grated condition or the juice of the sugar-beet, sugar-cane, or sorghum or the sugar-containing refuse materials of the beet or cane sugar factories may be used when more convenient, or the sugar and carbohydrates of any vegetable may be used. I propose to use the juices of any of the various vegetables which, by fermentation or combustion, will produce a constant heat and carry out the purposes of this invention.

In practice the composition can be made and applied to the hotbed or to the incubator and allowed to produce the heat until the carbohydrates are consumed or the fermentation ceases; or, more preferably, the absorbent matter will be placed around perforated pipes and through these the solution will be applied to the material to constantly maintain the combustion or fermentation as long as the same will be needed for the particular purpose in hand.

F indicates valves for regulating the amount of the solution supplied to the absorbent.

a indicates a cover on the incubator.

a' indicates drainage-pipes to carry off any surplus liquid.

Having described my invention, what I claim, and desire to secure by Letters Patent, is—

1. The method of maintaining a constant and uniform heat suitable for hotbeds, incubators, &c., which consists in supplying to a bed of absorbent organic material a solution of sugar or molasses or other vegetable extract containing carbohydrates.

2. The composition for producing and maintaining heat for incubators and for horticultural and other purposes, which is composed of absorbent organic material and a solution containing carbohydrates.

3. The composition for producing and maintaining heat for incubators and for horticultural purposes, which is composed principally of absorbent organic material and refuse from sugar or glucose factories.

EMIL TURCK.

Witnesses:
JAMES R. TOWNSEND,
ALFRED I. TOWNSEND.